United States Patent
Orlassino et al.

(10) Patent No.: US 8,078,104 B2
(45) Date of Patent: *Dec. 13, 2011

(54) SYSTEM AND METHOD FOR MULTI-MODE RADIO OPERATION

(75) Inventors: Mark Orlassino, Centereach, NY (US); George Dellaratta, Shirley, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 560 days.

This patent is subject to a terminal disclaimer.

(21) Appl. No.: 12/027,437

(22) Filed: Feb. 7, 2008

(65) Prior Publication Data

US 2008/0144569 A1    Jun. 19, 2008

Related U.S. Application Data

(63) Continuation of application No. 10/996,533, filed on Nov. 24, 2004, now Pat. No. 7,330,696.

(51) Int. Cl.
*H04B 7/00* (2006.01)
*H04K 3/00* (2006.01)

(52) U.S. Cl. .................. 455/41.2; 455/426.1; 455/552.1

(58) Field of Classification Search ........ 455/41.2–41.3, 455/426.1–426.2, 552.1–553.1; 370/338
See application file for complete search history.

(56) References Cited

U.S. PATENT DOCUMENTS

| | | | |
|---|---|---|---|
| 7,330,696 | B2 | 2/2008 | Orlassino et al. |
| 2003/0131047 | A1 | 7/2003 | Takeyoshi et al. |
| 2004/0023665 | A1 | 2/2004 | Simmonds et al. |
| 2004/0198404 | A1 | 10/2004 | Attar et al. |
| 2004/0223469 | A1 | 11/2004 | Bahl et al. |
| 2005/0157674 | A1 | 7/2005 | Wentink |

FOREIGN PATENT DOCUMENTS

| | | |
|---|---|---|
| JP | 11331235 | 11/1999 |
| JP | 2004229237 | 8/2004 |

OTHER PUBLICATIONS

Non-final rejection dated Oct. 18, 2006 in U.S. Appl. No. 10/996,533, which is the parent application of U.S. Appl. No. 12/027,437.
Non-final rejection dated Apr. 11, 2007 in U.S. Appl. No. 10/996,533, which is the parent application of U.S. Appl. No. 12/027,437.
Notice of Allowance dated Sep. 18, 2007 in U.S. Appl. No. 10/996,533, which is the parent application of U.S. Appl. No. 12/027,437.
English translation of Office Action dated Nov. 20, 2010 in related Japan patent application No. 2007-543430.
Office Action dated Jun. 7, 2011 in related Canada patent application No. 2,586,926.
English translation of Office Action dated Jun. 3, 2011 in related Japan patent application No. 2007-543430.

*Primary Examiner* — Lee Nguyen

(57) ABSTRACT

Described is a system having a mobile station and an access point which connects the mobile station to a network. The mobile station has a first mode of operation and a second mode of operation. In the first mode of operation, the mobile station transmits a data packet intended for a further mobile station to the access point and the access point transmits the data packet to the further mobile station. In the second mode of operation, the mobile station transmits the data packet intended for the further mobile station directly to the further mobile station.

20 Claims, 15 Drawing Sheets

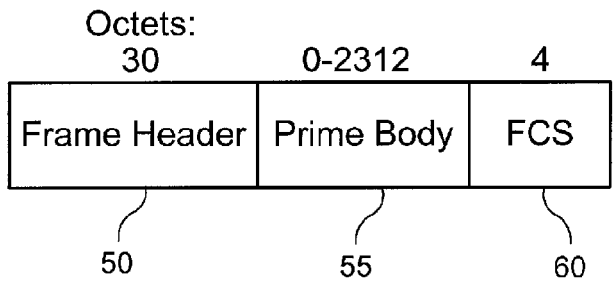
F I G. 4
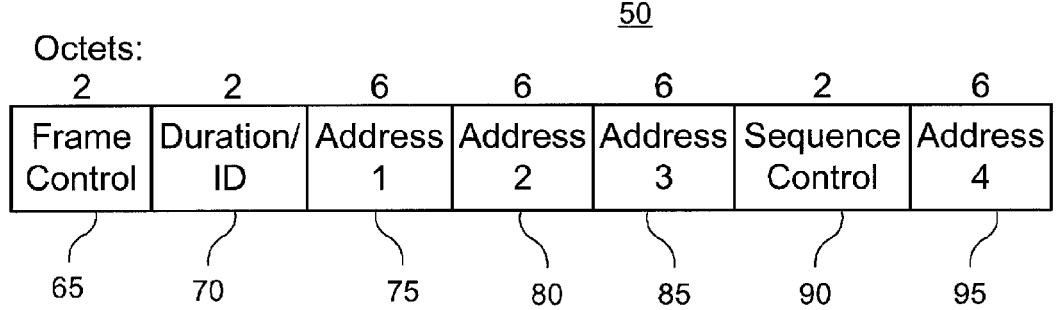
F I G. 5
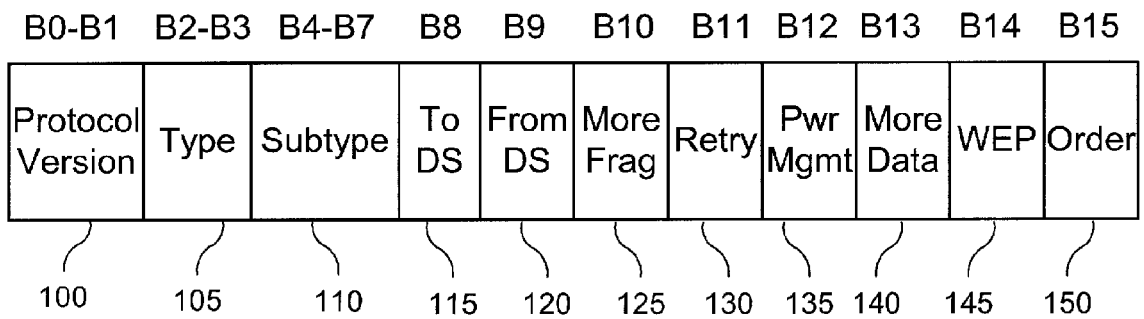
F I G. 6

| Type Value | Type Description |
|---|---|
| 00 | Management |
| 01 | Control |
| 10 | Data |
| 11 | Reserved |

F I G. 7

| Type Value B2, B3 | Type Description | Type Subvalue B7, B6, B5, B4 | Type Description |
|---|---|---|---|
| 10 | Data | 1000 | Data + Power Increase |
| 10 | Data | 1100 | Data + Power Decrease |
| 10 | Data | 1001 | Data + CF-ACK + Power Increase |
| 10 | Data | 1101 | Data + CF-ACK + Power Decrease |
| 10 | Data | 1010 | ACK + Power Increase (no data) |
| 10 | Data | 1110 | ACK + Power Decrease (no data) |

F I G. 8

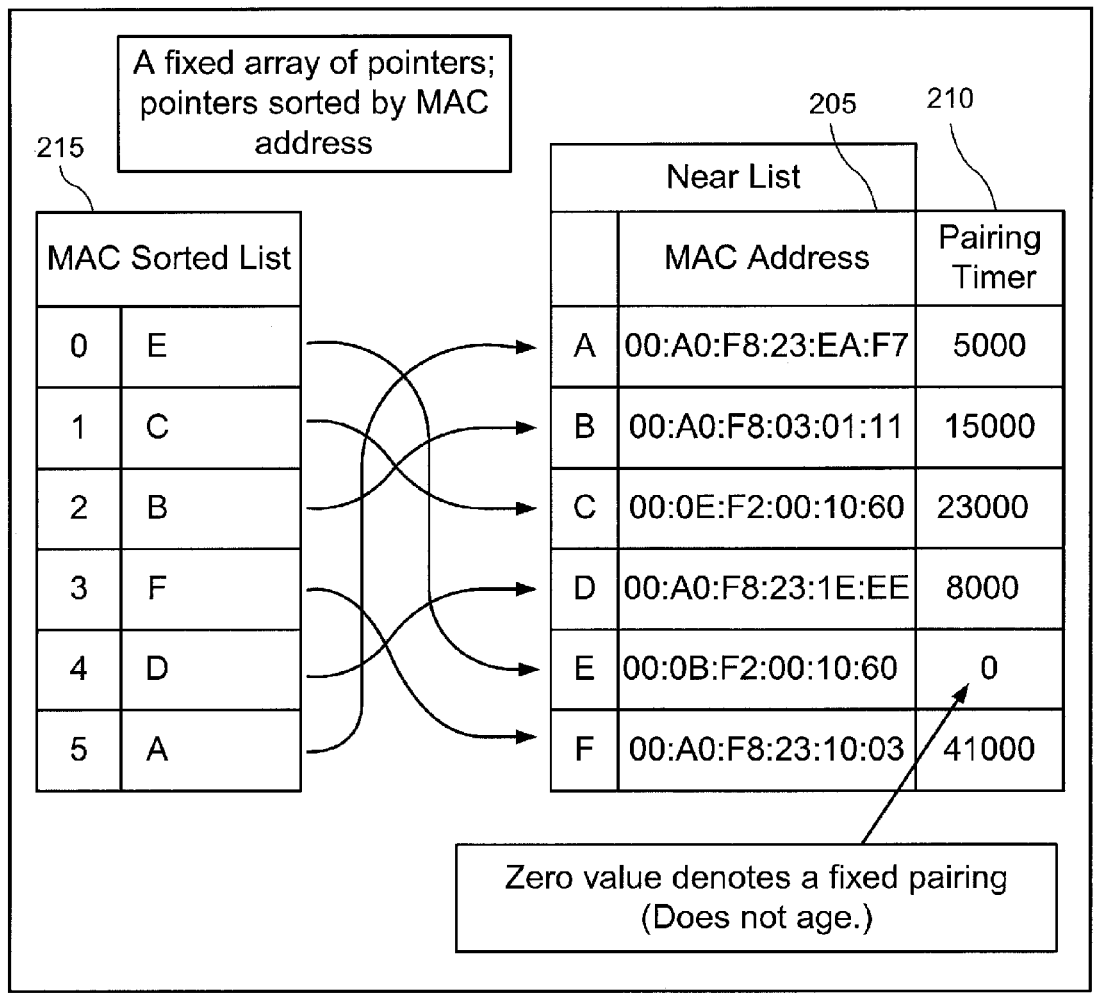
F I G. 12

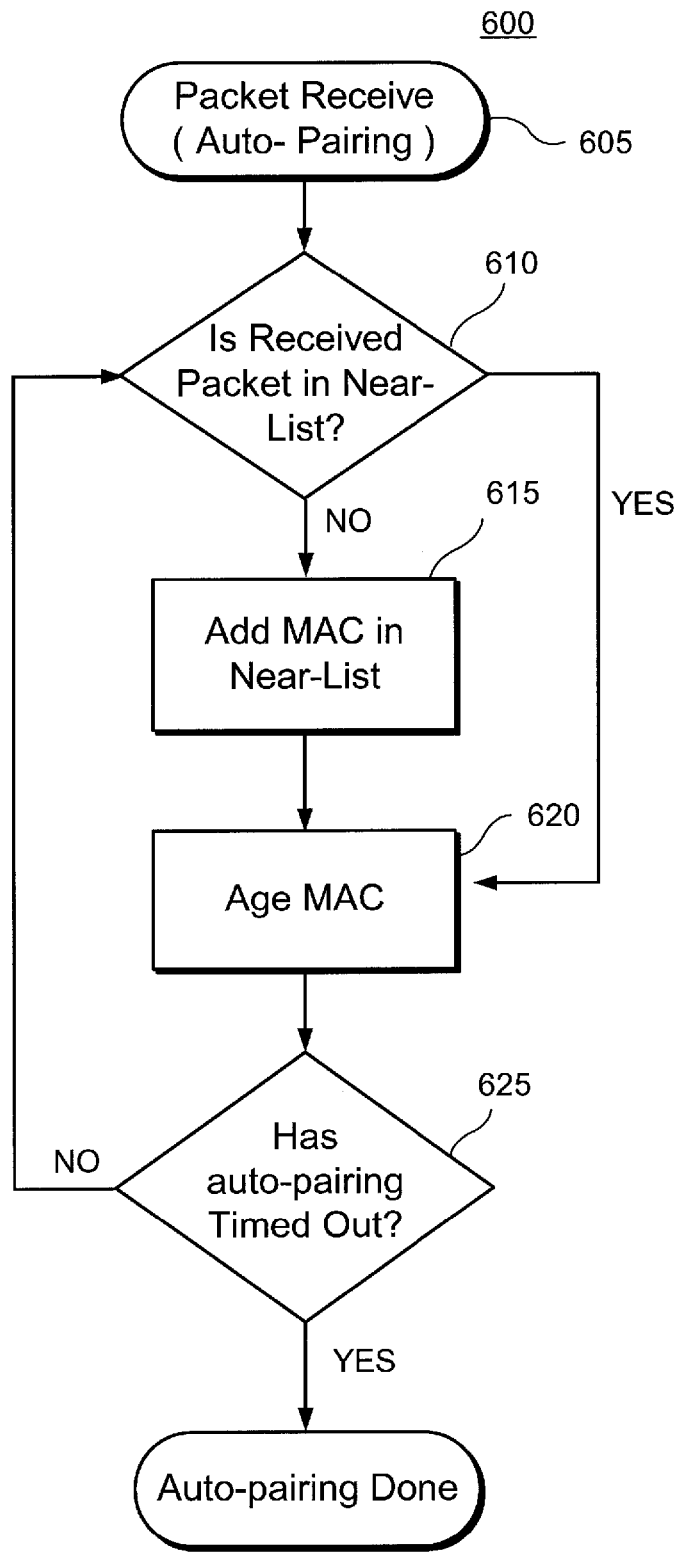
F I G. 16

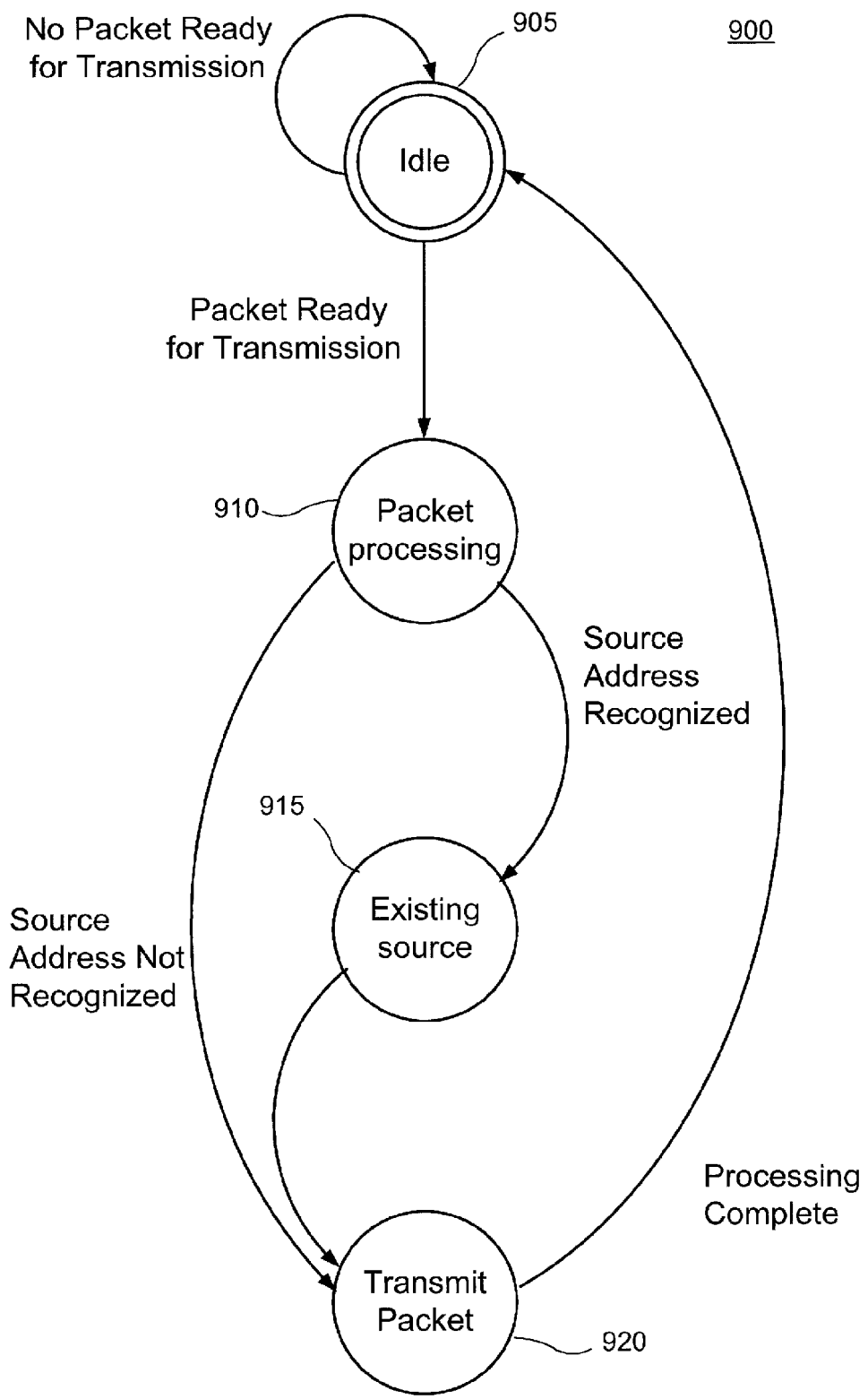
F I G. 19

SYSTEM AND METHOD FOR MULTI-MODE RADIO OPERATION

PRIORITY CLAIM

The present application is a Continuation application of U.S. patent application Ser. No. 10/996,533 filed on Nov. 24, 2004 now U.S. Pat. No. 7,330,696 entitled "System and Method for Multi-Mode Radio Operation". The entire disclosure of this application is expressly incorporated herein by reference.

BACKGROUND

A conventional system may utilize a mobile unit that transmits and receives signals according to a wireless communication protocol (e.g., the IEEE 802.11 standard). The IEEE 802.11 standard defines two different types of networks: an ad-hoc network, or independent basic service set ("IBSS"), and an infrastructure network, or extended service set ("ESS"). In the infrastructure network, the mobile unit communicates with a further mobile unit or network device through an access point in conjunction with a distribution system (e.g., WAN, WWAN, LAN, WLAN, PAN, WPAN, etc.). Whereas, in the ad-hoc network, the mobile unit communicates directly with a further mobile unit or other network device.

Under the 802.11 standard, the ad hoc network and the infrastructure network are mutually exclusive of each other. That is, if the mobile unit desired to connect to a printer, the printer could be added to the infrastructure network, thereby becoming a network resource available to the entire network. The mobile unit would communicate with the printer via the access point. In contrast, the mobile unit may establish exclusive communication with the printer by first disconnecting from the infrastructure network and switching to the ad-hoc network, where the mobile unit communicates directly with the printer without utilizing the access point.

As currently implemented, the infrastructure network and the ad-hoc network have inherent disadvantages. For example, if the printer is added to the infrastructure network, data sent to the printer adds an additional load to network traffic, and the printer is subject to unwanted network activity. However, if the printer communicates with the mobile unit in an ad-hoc network, the mobile unit must disconnect from the infrastructure network. Thus, there presents a need for a simultaneous infrastructure/ad-hoc operating mode, or simultaneous basic service set ("SBSS"), whereby the mobile unit can maintain connection to the infrastructure network, while sending data directly to the printer.

SUMMARY OF THE INVENTION

A system having a mobile station and an access point which connects the mobile station to a network. The mobile station has a first mode of operation and a second mode of operation. In the first mode of operation, the mobile station transmits a data packet intended for a further mobile station to the access point and the access point transmits the data packet to the further mobile station. In the second mode of operation, the mobile station transmits the data packet intended for the further mobile station directly to the further mobile station.

In addition, a mobile station having a processor and a memory storing a set of instructions for execution on the processor. The set of instructions comprises a first mode of operation and a second mode of operation. In the first mode of operation, the mobile station transmits a data packet intended for a further mobile station to an access point connected to a network, and the access point transmits the data packet to the further mobile station. In the second mode of operation, the mobile station transmits the data packet intended for the further mobile station to the further mobile station.

Furthermore, a method for checking a field of a media access control frame transmitted to a mobile station, adjusting transmission power of the mobile station based on a value in the field and transmitting a next media access control frame using the adjusted transmission power.

A method for sending a data packet destined for a mobile unit to an access point, listening for one of a transmission of the data packet by the access point to the mobile unit and a transmission of an acknowledgment by the mobile unit to the access point, adding an address of the mobile unit to a table when the one of the listened for transmissions is detected and sending a further data packet destined for the mobile unit directly to the mobile unit when the address is present in the table.

BRIEF DESCRIPTION OF THE DRAWINGS

FIG. 4 is an exemplary embodiment of a MAC frame according to the present invention.

FIG. 5 is a detailed view of a frame body of the MAC frame of FIG. 4.

FIG. 6 is a detailed view of a frame control field of the frame body of FIG. 5.

FIG. 7 is a table of type values and associated descriptions according to the present invention.

FIG. 8 is a table of subtype values and associated descriptions according to the present invention.

FIG. 12 is an exemplary embodiment of a table of hardware addresses according to the present invention.

FIG. 16 is an exemplary embodiment of a method for entering the hardware address of the mobile station in the table of a further mobile station according to the present invention.

FIG. 19 is an exemplary embodiment of the power adjustment mechanism of FIG. 18 for the mobile station transmitting the data packet according to the present invention.

DETAILED DESCRIPTION

Figure 1:
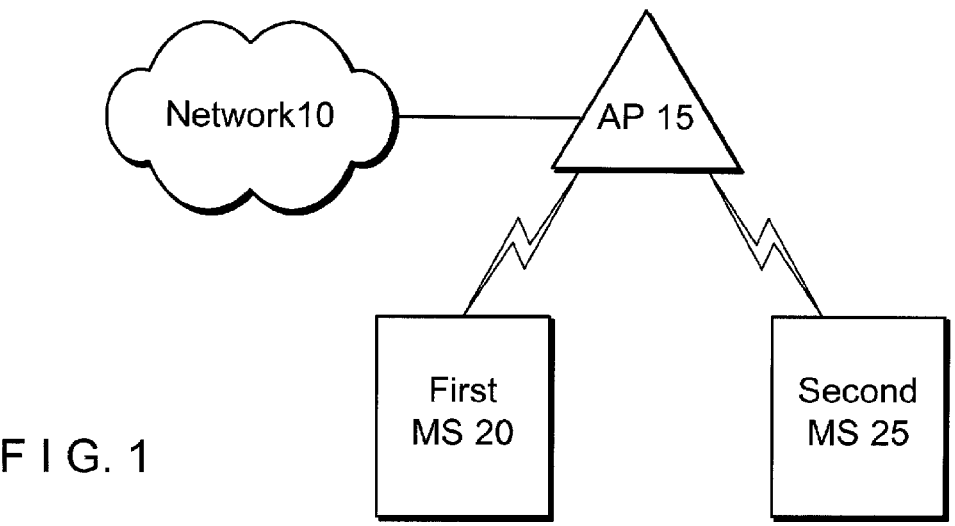
FIG. 1 is an exemplary embodiment of a system utilizing a first mode of operation according to the present invention.

The present invention may be further understood with reference to the following description and the appended drawings, wherein like elements are referred to with the same reference numerals. As shown in FIG. 1, the present invention includes a system 5 which provides for a multi-mode radio operation. The system 5 includes a wireless network 10 (e.g., WLAN, WPAN) that is connected to an access point 15 ("AP"). According to the present invention, a first mobile station 20 ("MS") (e.g., PC, laptop, cell phone, PDA, handheld computer, radio transceiver, etc.) may desire to communicate with a second MS 25. The first MS 20 and the second MS 25 operate according to an existing communication protocol, such as the IEEE 802.11 standard. As such, both the first MS 20 and the second MS 25 may have similar functionality, capabilities and components (e.g., processors, antennas, memory, etc.), including those described herein. In other embodiments of the present invention, the second MS 25 may be a receiver device (e.g., a printer, a headset, etc.). Though the invention may be described with regard to the first MS 20, those skilled in the art would understand that the present invention may be applied to any radio transceiver communicating over a network. Thus, the terms "first" and "second" are not limiting, but only provided for clarity and illustration of the exemplary embodiments of the invention.

The first MS 20 has a first mode of operation, which is based on the existing communication protocol, such as the IEEE 802.11 standard. In the first mode of operation, the first MS 20 desires to send a data packet to the second MS 25. As is known in the art, and according to the 802.11 standard (e.g., the infrastructure network), the first MS 20 transmits the data packet to the AP 15 that is associated with the first MS 20. If the first MS 20 and the second MS 25 are associated with the AP 15, the AP 15 then transmits the data packet to the second MS 25. However, if the second MS 25 is not associated with the AP 15, the AP 15 transmits the data packet to the wireless network 10, which, in turn, transmits the data packet to a further AP which is associated with the second MS 25. As would be understood by those skilled in the art, any number of APs may be connected to the wireless network 10.

The transmission of the data packet from the first MS 20 to the AP 15, in a wireless setting such as described herein, is known in the art as a "hop." Thus, according to the 802.11 standard, the minimum number of hops that is required to transmit the data packet from the first MS 20 to the second MS 25 is two hops: one hop from the first MS 20 to the AP 15, and a second hop from the AP 15 to the second MS 25. The minimum two hops happens only when the AP 15 is associated with the first MS 20 and the second MS 25.

Figure 2:
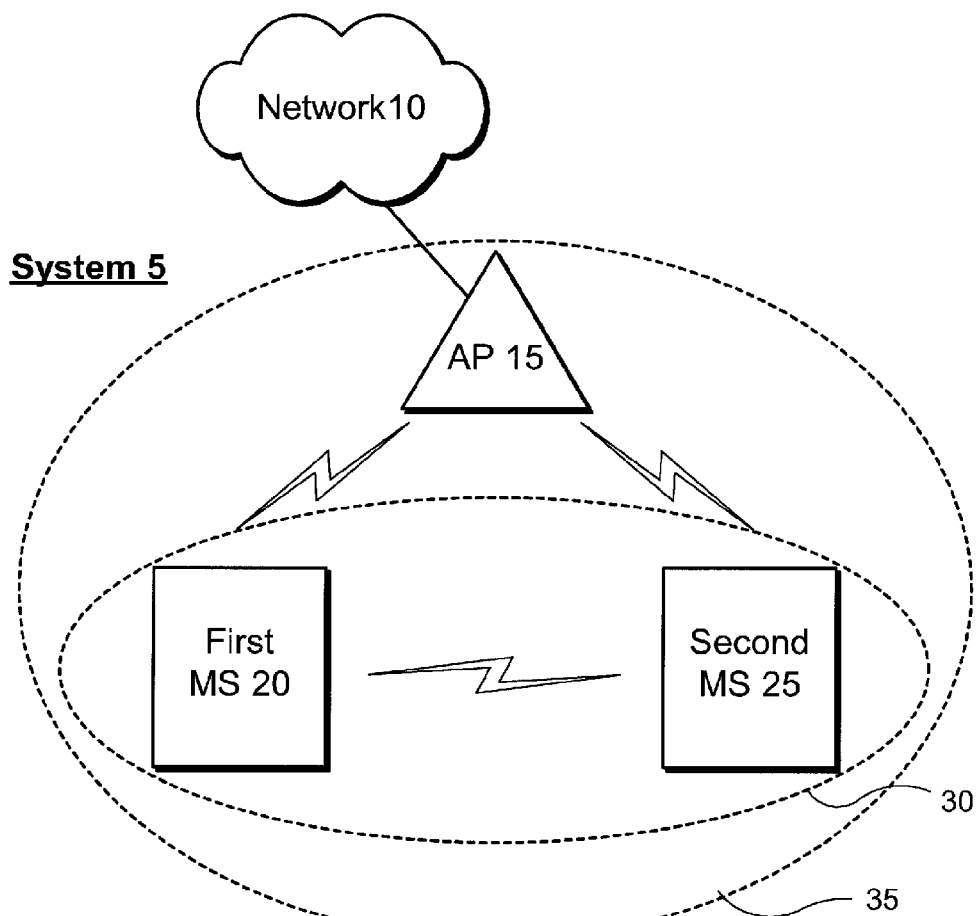
FIG. 2 is an exemplary embodiment of the system of FIG. 1 utilizing both the first mode of operation and a second mode of operation according to the present invention.

The first MS 20 is further capable of utilizing a second mode of operation, shown in FIG. 2, based on the existing communication protocol. In the second mode, and according to the present invention, the first MS 20 intends to transmit the data packet to the second MS 25. However, in the second mode, the transmission of the data packet can be accomplished in one hop. That is, the first MS 20 can transmit the data packet directly to the second MS 25, without having to utilize the AP 15. As will be described herein, the second mode of operation is usable under certain conditions. However, the present invention allows the simultaneous use of both the first and second modes by the MSs 20,25. Thus, the first MS 20 may not have to disconnect from the wireless network 10 when communicating directly with the second MS 25.

With reference to FIG. 2, the first MS 20 and the second MS 25 may be paired to form a local cell 30. As would be understood by those skilled in the art, the local cell 30 is defined by a communicable range in which the first MS 20 can transmit and receive radio frequency ("RF") signals. The local cell 30 may be located within an AP cell 35 which is defined by an RF transmit/receive range of the AP 15. To successfully communicate using the second mode of operation, the second MS 25 must be within the local cell 30 (i.e., MS 20 and MS 25 are within communicable range of each other). However, as will be described below, the MS 20 may remain in the second mode even if the MS 25 moves out of communicable range.

Forming the local cell 30 may be accomplished in several ways. In one exemplary embodiment, the first MS 20 may be manually paired to the second MS 25. Manual pairing may be accomplished by, for example, entering a hardware address of the second MS 25 into a table 200, or near-list, contained within the first MS 20, which is shown in FIG. 12 and described below. As would be understood by those skilled in the art, the term "hardware address" may be used to describe any unique address associated with a mobile device, for example, a media access control ("MAC") address and/or basic service set identification ("BSSID") throughout the application. Those terms may be used interchangeably throughout this description. The table 200 may further include a set of parameters associated with the hardware address. In this exemplary embodiment, the first MS 20 may be a mobile computer that is manually paired to the second MS 25 which is a dedicated printer. In this manner, the first MS 20 and the second MS 25 may only look for and communicate with each other. Any other activity in the AP cell 35 may go through the AP 15. However, in the same embodiment the MSs 20,25 may receive transmissions from other MSs within the AP cell 35.

As would be understood by those skilled in the art, the local cell 30 may further include any other MSs that are in communicable range with the first MS 20. The first MS 20 may be manually paired with any number of other MSs that are within the local cell 30 at a given time. Hardware addresses for the other MSs may be manually entered into the table 200 of the first MS 20. For example, the first MS 20 may be the mobile computer which is manually paired to the second MS 25 which is the dedicated printer. The local cell 30 formed by the first MS 20 and the second MS 25 may further include a further MS which may be a data capture device (e.g., bar code scanner, RFID reader, Magstripe reader, etc.).

In a further embodiment, the local cell 30 may be formed automatically. In this embodiment, the first MS 20 can monitor and track any MS that comes within the local cell 30. For example, if the second MS 25 is located within the AP cell 35, but not within the communicable range of the first MS 20, the hardware address of the second MS 25 will not be in the table 200 of the first MS 20. However, when the second MS 25 moves into the communicable range of the first MS 20, the first MS 20 may include the hardware address of the second MS 25 in the table 200. This process will be described in further detail below.

Figure 3:
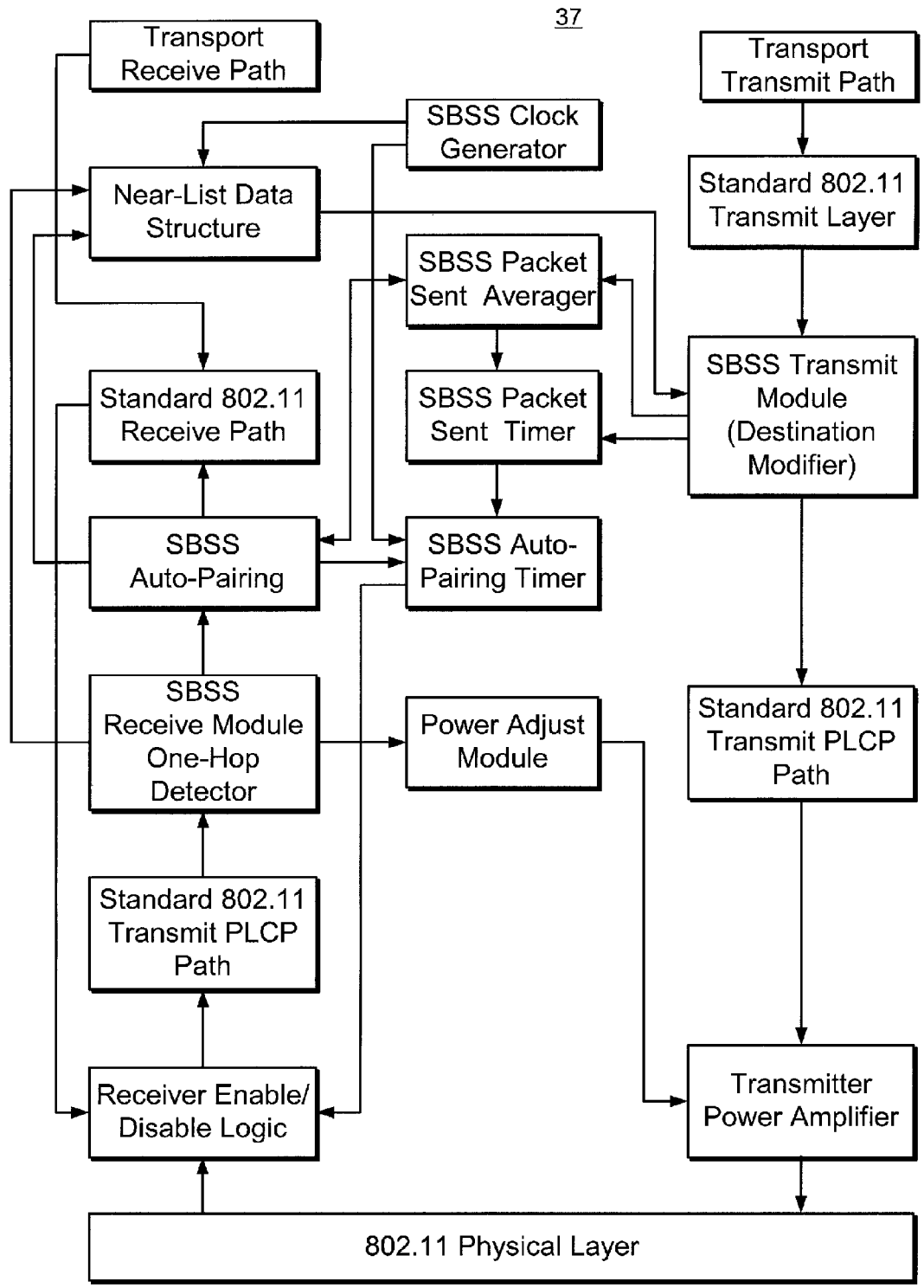
FIG. 3 is an exemplary embodiment of an architecture of a mobile station according to the present invention.

FIG. 3 shows an exemplary embodiment of a computing architecture 37 of the first MS 20. The architecture 37 allows the first MS 20 to utilize the first and second modes of operation. Specifically, the architecture 37 allows the first MS 20 to communicate directly with the second MS 25 without disconnecting from the wireless network 10. Operation of the computer architecture 37 will be described in further detail below.

According to the present invention, transmission of a data packet from the first MS 20 to the second MS 25 may be accomplished using a MAC frame 40, an exemplary embodiment of which is seen in FIG. 4. The MAC frame 40 includes a frame header 50, a frame body 55 and a frame check sequence ("FCS") 60. The frame header 50 typically has a 30 byte capacity, while the frame body 55 has a 2312 byte capacity and the FCS 60 has a 6 byte capacity. Each MAC frame 40 may correspond to a different function. For example, the MAC frame 40 may be used for a control function, a management function or a data function. As would be understood by those skilled in the art, the frame body 55 may change (e.g., capacity, format, content, etc.) based on the function to be accomplished.

The frame header 50 of the MAC frame 40 is shown in further detail in FIG. 5. Components and properties of the frame header 50 are generally known in the art. The frame header 50 includes a frame control field 65 adjacent to a duration/identification field 70, each of which may have a 2 byte capacity. The duration/identification field 70 for the data function represents the duration of the MAC frame 40, whereas for the control function, the field 70 represents an identity of the wireless station that initiated the transmission. A first address field 75 follows the duration/identification field 70 and represents a source address of the transmission (e.g., the hardware address of the first MS 20). A second address field 80 adjacent to the first address field 75 represents a destination address of the transmission (e.g., the hardware address of the second MS 25). A third address field 85 adjacent to the second address field 80 represents a receiving station address. As shown in FIG. 5, a sequence control field 90 may be adjacent to the third address field 85. The sequence control field 90 may have a 2 byte capacity. A fourth address field 95 represents a transmitting station address. In an exemplary embodiment, each address field 75,80,85,95 may have a 6 byte capacity, but the present invention may be implemented regardless of the size.

An expanded view of the frame control field 65 is shown in FIG. 6. As noted above, the frame control field 65 has a 2 byte capacity, and the expanded view shows a bit-by-bit view. A protocol version field 100 is shown as the first portion of the frame control field 65. The protocol version field 100 is typically set to zero. A type field 105 and a subtype field 110 follow the protocol version field 100, and together describe the function (e.g., data, control, management) of the MAC frame 40. A "to DS" field 115 is adjacent to the subtype field 110. When the "to DS" field 115 has a one value, the MAC frame is transmitted to the distribution system. Adjacent to the "to DS" field 115 is a "from DS" field 120. When the "from DS" field 120 has a one value, the MAC frame has come from the distribution system.

Further included in the frame control field 65 is a "more frag" field 125, which is located adjacent to the "from DS" frame 120. A one value in the "more frag" field 125 represents that one or more fragment frames may follow, whereas a zero value represents that this MAC frame 40 is an unfragmented frame or a last MAC frame. Adjacent to the "more frag" field 125 is a retry field 130, which, if a one value is present, indicates that this MAC frame 40 is a retransimission. A power management field 135 is seen disposed adjacent to the retry field 130. A one value indicates that the wireless station is in active mode, whereas a zero value indicates that the wireless station is in a power-save mode (e.g., sleep mode).

Further included in the frame control field 65 is a "more data" field 140, which is disposed adjacent to the power management field 135. A one value in the "more data" field 140 indicates that an additional MAC frame(s) is buffered with the intention to be sent to the destination address of the transmission. A one value in a wired equivalent privacy ("WEP") field 145 indicates that the data packet has been processed with a WEP algorithm. As understood by those skilled in the art, WEP is a security protocol for a WLAN, as defined in the 802.11 standard. A final field in the frame control field 65 is an order field 150, which, if a one value is present, indicates that the MAC frames must be strictly ordered when transmitted/received.

As noted above, the type field 105 together with the subtype field 110 describe the function of the MAC frame 40. As seen in FIG. 7, a "00" type value indicates that the MAC frame 40 will perform the management function; a "01" type value indicates a control function; a "10" indicates a data function. A "11" type value is designated as reserved, according to the 802.11 standard. Thus, using the reserved type, each function (e.g., management, control, data) may have up to eight reserved subtypes, those dedicated to the function (four) plus the reserved type (four). For example, the data function may have up to eight dedicated subtypes (e.g., 1000 hex through 1111 hex).

An exemplary embodiment of proposed type and subtype combinations is shown in FIG. 8. The subtype field 110 may comprise four bit values (i.e., b4-b7), each of which may indicate an event, status, setting, change, etc. For example, in the exemplary embodiment shown, the b6 value may indicate a power change. As such, a power increase may be indicated by a zero value, whereas a power decrease value may be indicated by a one. In this manner, the b6 value may be used to signify an increase or decrease in transmit power. The b7 value may be used to identify to further wireless stations that this MAC frame 40 came from the wireless station operating according to the second mode of operation.

Figure 9:
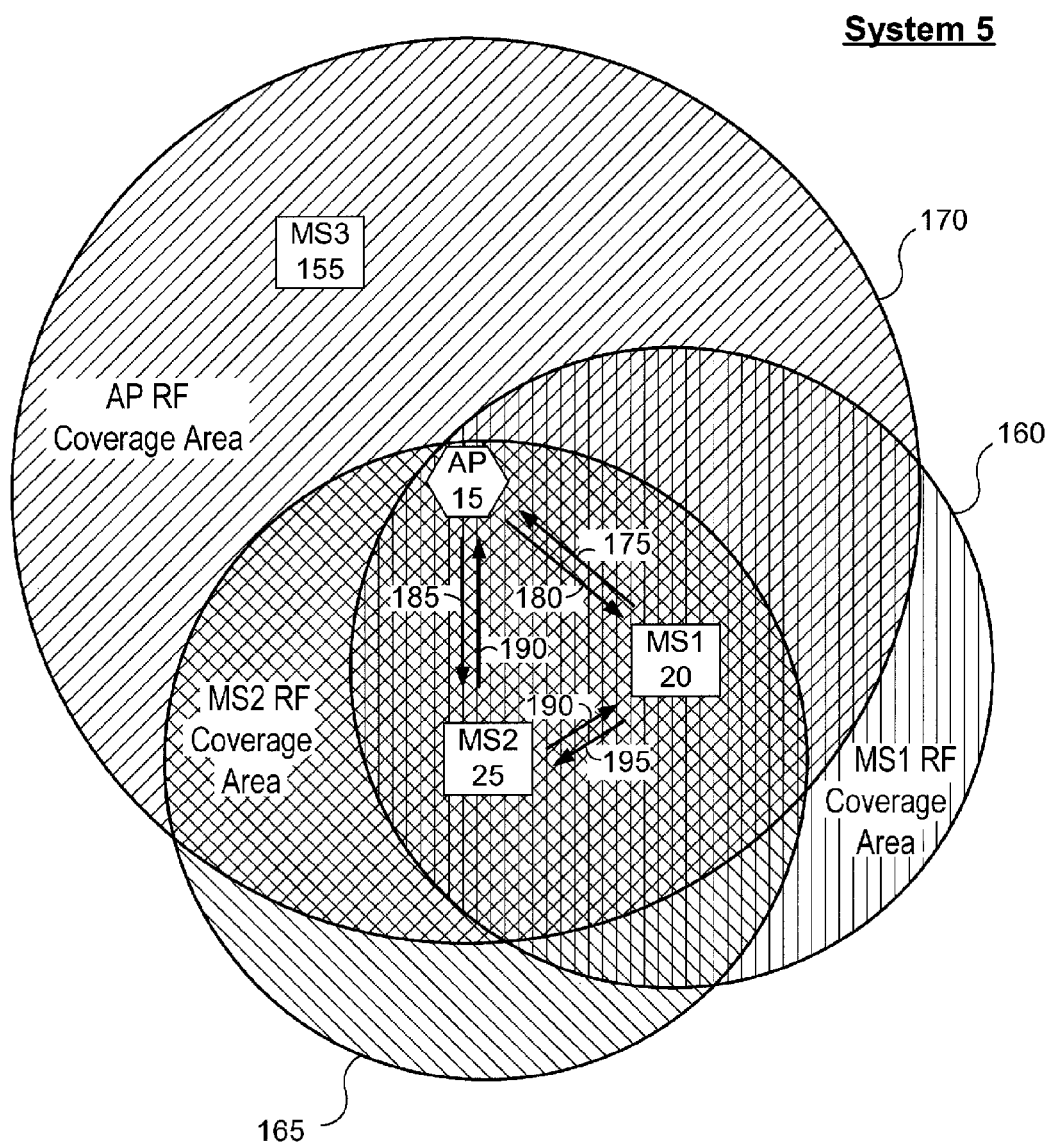
FIG. 9 is an exemplary embodiment of the system using a first mode of operation according to the present invention.

The first and second modes of operation will now be described in further detail. As shown in FIG. 9, the system 5 includes the AP 15, the first MS 20, the second MS 25 and a third MS 155, Each MS 20,25,155 has a radio frequency ("RF") coverage area 160,165,170, respectively, associated therewith, which defines the range that the MS can effectively transmit and receive RF signals. According to the first mode of operation, the first MS 20 intends to send a data packet to the second MS 25, but does not know that the second MS 25 is within the coverage area 160 of the first MS 20. As such, the first MS 20 sends a data packet source signal 175 to the AP 15. The AP 15 sends an AP acknowledgment signal 180 back to the first MS 20 confirming receipt of the data packet source signal 175. As would be understood by those skilled in the art, the AP 15 may not send the AP acknowledgment signal 180 if, for example, the data packet source signal 175 has been distorted, is unrecognizable or corrupted.

The AP 15 then relays the data packet to the second MS 25 using a data packet destination signal 185. The second MS 25 sends an MS acknowledgment signal ("ACK") 190 back to the AP 15 to confirm receipt of the data packet destination signal 185. According to the present invention, the first MS 20, after sending the data packet source signal 175, begins listening for transmissions from other wireless stations (e.g., APs, MSs) within its RF coverage area 160. Specifically, the first MS 20 listens for the data packet destination signal 185 from the AP 15 and/or the MS acknowledgment signal 190 from the second MS 25. The first MS 20 may not hear the data packet destination signal 185 if, for example, the second MS 25 is not located within the AP cell 35. That is, if the second MS 25 is associated with a further AP connected to the network 10, the AP 15 may transmit the data packet destination signal 185 to the further AP via the network 10. Thus, the first MS 20 may not hear the data packet destination signal 185 transmitted from the further AP, which is outside of the local cell 30. Similarly, the first MS 20 may not hear the MS acknowledgment signal 190 if the second MS 25 is outside of the local cell 30.

If the first MS 20 hears one or both of the signals 185,190, the first MS 20 may assume that the second MS 25 is within the RF coverage area 160 of the first MS 20. As such, the first MS 20 may switch to the second mode of operation and may send a further data packet signal(s) 195 directly to the second MS 25, without utilizing the AP 15. The second MS 25 may then send the MS acknowledgment signal 190 to the first MS 20, rather than the AP 15. If, however, the first MS 20 does not hear the data packet destination signal 185 and/or the MS acknowledgment signal 190, then the first MS 20 may continue to send data packet signals according to the first mode of operation (i.e., through the AP 15). Also, if the first MS 20 sends the further data packet signal 195 to the second MS 25 and does not receive the MS acknowledgment signal 190 from the second MS 25, the first MS 20 may abort communication using the second mode of operation, and revert to the first mode of operation. This may happen when, for example, the second MS 25 moves out of the RF coverage area 160 of the first MS 20.

Figure 10:
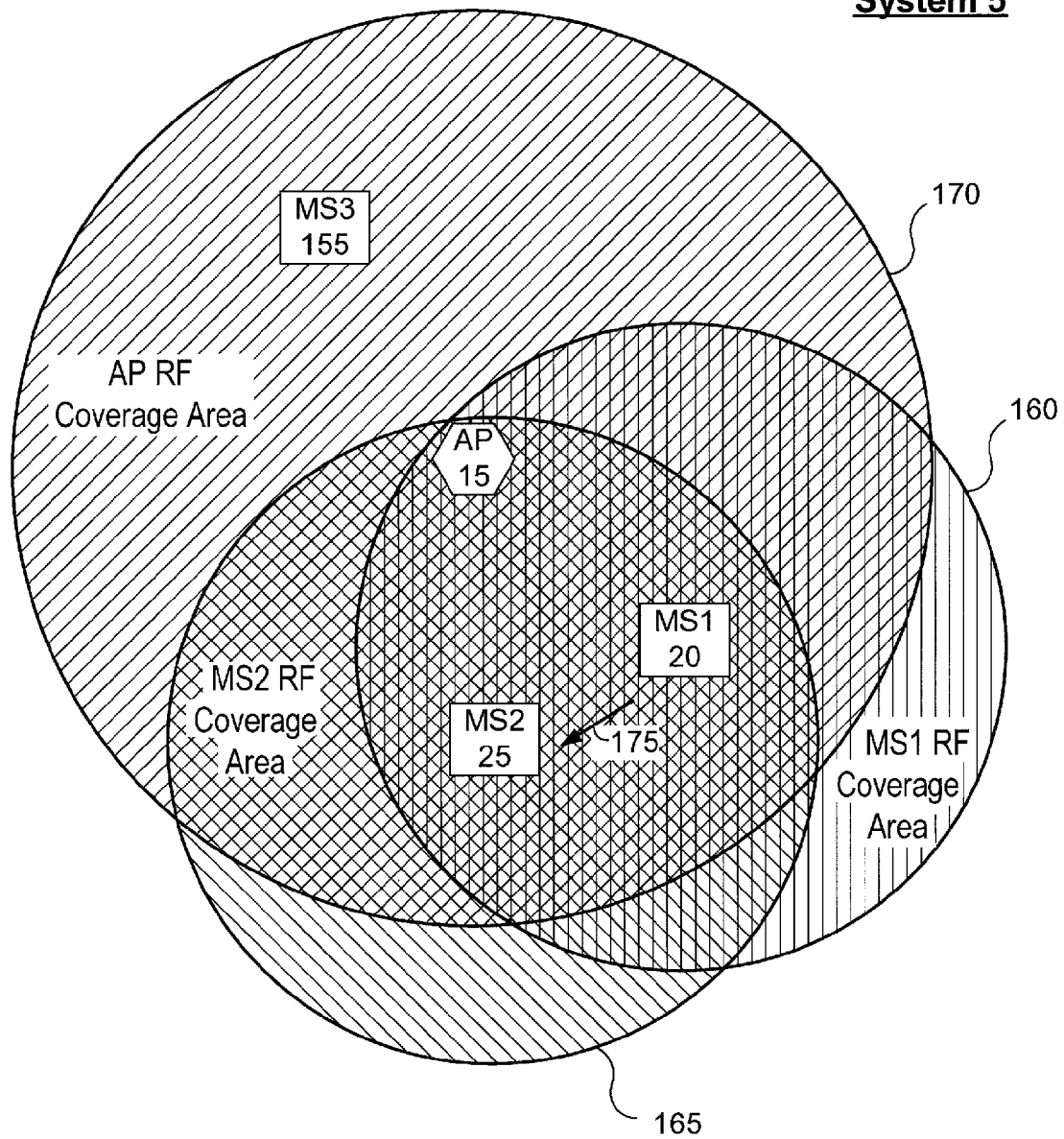
FIG. 10 is an exemplary embodiment of the system of FIG. 9 using a second mode of operation according to the present invention.

After the first MS 20 has received an indication that the second MS 25 is within the RF coverage area 160, the first MS 20 may include the hardware address of the second MS 25 in the table 200. Thus, the first MS 20 may continue communicating with the second MS 25 using the second mode of operation, until, for example, the second MS 25 moves out of the RF coverage area 160. However, the first MS 20 may maintain the hardware address of the second MS 25 in the table 200 for a predetermined amount of time which will be explained further below. As shown in FIG. 10, the second MS 25 has re-entered the RF coverage area 160 of the first MS 20 after temporarily moving out of the RF coverage area 160. The first MS 20 retains the hardware address of the second MS 25 for a predetermined time after the hardware address is stored on the first MS 20. This timing will be described in greater detail below. Thus, the first MS 20 may immediately initiate communication with the second MS 25 using the second mode of operation during this predetermined time period. That is, the first MS 20 does not have to wait to hear the MS acknowledgment signal 190 from the second MS 25 to initiate the second mode of operation. Thus, the first MS 20 may assume that the second MS 25 remains within the RF coverage area 160 and send the data packet source signal 175 directly to the second MS 25. If the first MS 20 receives the MS acknowledgment signal 190 from the second MS 25, the first MS 20 thereby confirms the second MS 25 remains in the local cell 30 and can continue to transmit further data packet signals 195 using the second mode. However, if the second MS 25 does not receive the data packet source signal 175, for example, because the second MS 25 has moved out of the RF coverage area 160, the first MS 20 will revert to the first mode to send the data packet as will be described below.

Figure 11:
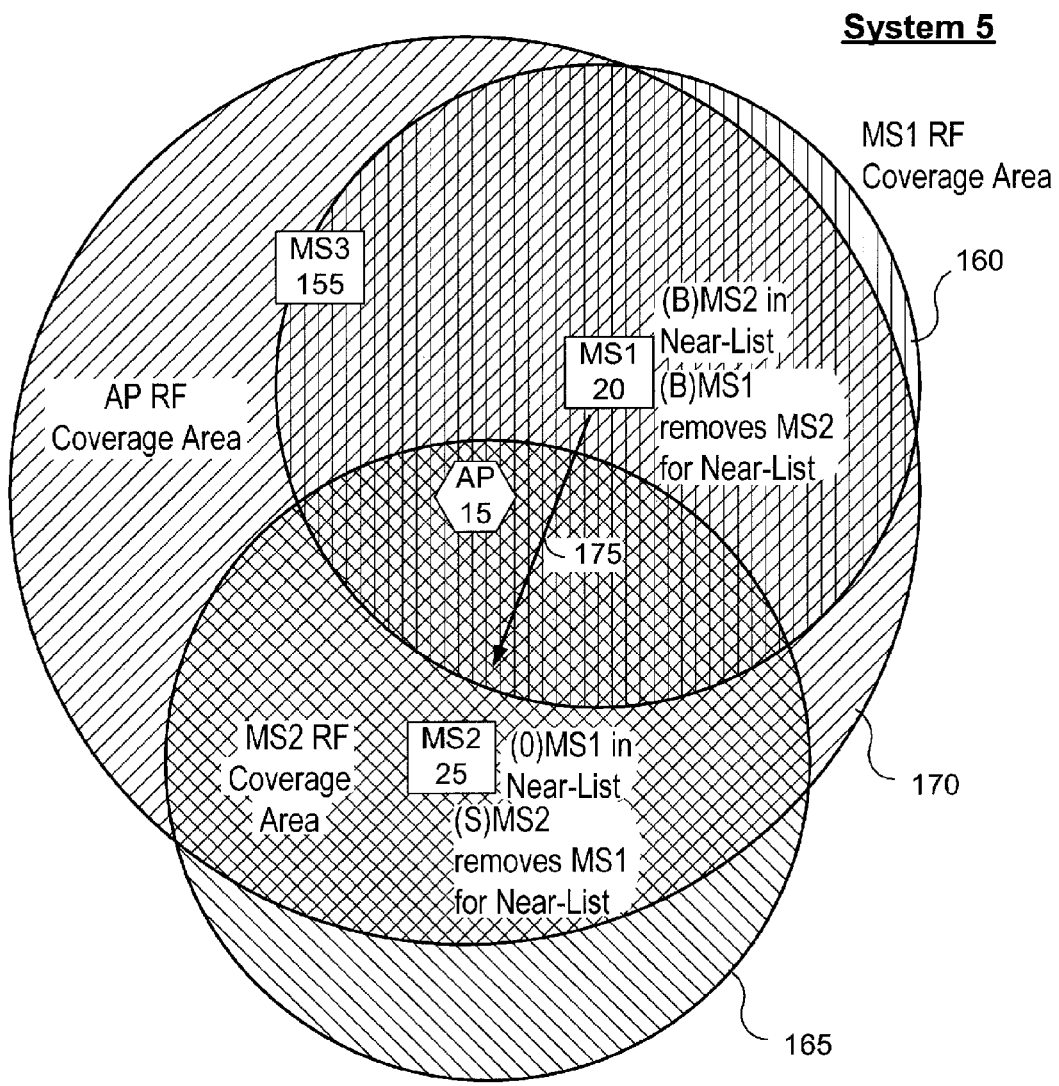
FIG. 11 is an exemplary embodiment of the system of FIG. 10 reverting to the first mode of operation.

As shown in FIG. 11, the first MS 20 may send the data packet source signal 175 or the further data packet signal 195 to the second MS 25, but the second MS 25 may have vacated the RF coverage area 160 of the first MS 20. Accordingly, the first MS 20 may attempt a predetermined number of retransmissions, with a uniform or exponential time interval (e.g., backoff) between each attempted retransmission. However, when the predetermined number of retransmissions reaches zero, or the predetermined time expires, the first MS 20 may remove the hardware address of the second MS 25 from the table 200. Thus, the first MS 20 may have to reacquire the hardware address of the second MS 25 at a later time, for example, when the second MS 25 moves back into the RF coverage area 160 of the first MS 20.

A further embodiment of the present invention involves utilization of the second mode of operation by the second MS 25. In this embodiment, the first MS 20 has previously sent the data packet source signal 175 and/or the further data packet signal 195 to the second MS 25. When the second MS 25 receives the signals 175,195, a logic circuit in the second MS 25 checks the fourth address field 95 to determine the hardware address of the wireless station that transmitted the data packet. Those of skill in the art will understand that the logic circuit as described herein may be implemented in software or hardware. Furthermore, any wireless station, including the first MS 20, may include the logic circuit described herein. If the fourth address field 95 has the hardware address of the AP 15 associated with the second MS 25, then the second MS 25 may assume that the first MS 20 is not within the RF coverage area 165 of the second MS 25, and the second MS 25 may transmit/receive data packets according to the first mode of operation. However, if the fourth address field 95 has the hardware address of the first MS 20, then the second MS 25 may assume that the first MS 20 is trying to initiate communication using the second mode of operation. The second MS 25 may then add the hardware address of the first MS 20 to the table 200 in the second MS 25 which lists the hardware addresses of any wireless station within the RF coverage area 165 of the second MS 25. As noted above, the second MS 25 may revert back to the first mode of operation after a predetermined number of failed retransmissions to the first MS 20 or a counter in the second MS 25 reaches zero or a predetermined number.

An exemplary embodiment of the table 200 is shown in FIG. 12. The table 200 will be described with reference to the first MS 20, but those of skill in the art will understand that any wireless station may include the table 200. The table 200 may include a hardware address field 205, a timer field and/or retransmission field 210. The hardware address field 205 may include the hardware addresses of any of the wireless stations (e.g., the AP 15, the second MS 25, the third MS 155) within the RF coverage area 160 of the first MS 20. The timer field 210 may include timer values that are associated with each hardware address in the hardware address field 205. For example, as seen in FIG. 12, the hardware address "00:A0:F8:23:EA:F7" has the timer value "5000" associated therewith. As noted above, the timer value may decrement to zero from a predetermined value (e.g., 45000 milliseconds), or increment to a predetermined value. The timer field 210 may alternatively be the retransmission field, which counts a number of failed retransmissions. According to the present invention, once the timer value reaches a limit value (e.g., zero, predetermined number), the hardware address associated therewith, and thus, the wireless station, may be removed from the table 200. As such, the first MS 20 may no longer initiate communication with that wireless station using the second mode of operation. However, the hardware address previously removed may be re-added to the table 200 if the wireless station re-enters the RF coverage area 160 of the first MS 20.

As would be understood by those skilled in the art, the wireless station or device that has been manually paired with the first MS 20 may have the timer value associated therewith set to a value that reflects such a manually pairing. For example, as shown in FIG. 12, the hardware address "00:0B:F2:00:10:60" has the timer value set to zero. This may indicate that the hardware address should not be removed, unless done so manually (i.e., no decrement or increment to the timer value).

The table 200 may further include a sorted list 215 (e.g., a fixed array of pointers) to optimize searches and resorting of the table 200 when, for example, hardware addresses are added/removed. When the hardware address needs to be found in the hardware address field 205, a binary search algorithm may be used on the sorted list 215 to quickly resolve the presence of the searched for hardware address. Similarly, when a new hardware address is appended to the table 200, the sorted list 210 may be re-organized to include the new hardware address. In this manner, less manipulation of a memory in the first MS 20 may be required. However, any search algorithm may be implemented based on the particular requirements of an individual system.

Figure 13:
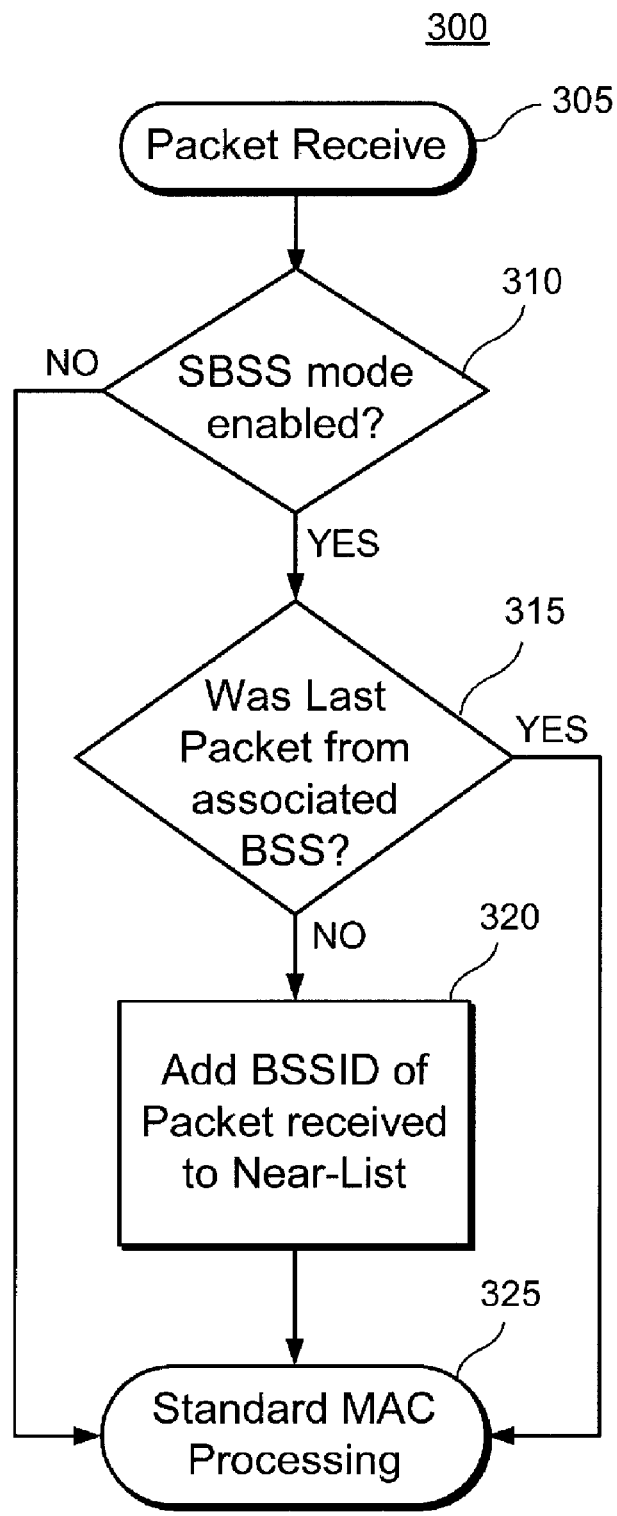
FIG. 13 is an exemplary embodiment of a method for adding a hardware address to the table of a receiving mobile station.

Operation of the logic circuit, which checks the hardware address of the received data packet against the list of hardware addresses in the table 200, is shown generally by the exemplary method 300 in FIG. 13. In step 305, the second MS 25 receives the data packet from the wireless station. In step 310, the logic circuit in the second MS 25 checks the fourth address field 95 of the MAC frame 40 to determine whether the data packet came from the AP 15 or the first MS 20. As would be understood by those skilled in the art, the second MS 25 may assume that the data packet came from another MS if the fourth address field 95 does not contain the hardware address of the AP with which the second MS 25 is currently associated (e.g., the AP 15). If the data packet came from the AP 15, then the second MS 25 processes the MAC frame 40 in the normal manner, as seen in step 325. However, if the data packet came from the first MS 20, as seen in step 315, then the second MS 25 checks its table 200 to determine if the hardware address of the first MS 25 is entered in the table 200. If the hardware address of the first MS 20 was found in the table 200, the timer value associated therewith is reset and the second MS 25 processes the MAC frame 40, as seen in step 325. As seen in step 320, if the hardware address of the first MS 20 was not in the table 200 of the second MS 25, then the hardware address is added to the table 200 and the table 200 is resorted. As understood by those skilled in the art, resetting the timer value in step 325 and adding the hardware address in step 320 may enable the second MS 25 to initiate communication with the first MS 20 using the second mode of operation by assuming that the first MS 20 is within RF coverage area 165. The timer value for the hardware address may be set via, for example, a management information base ("MIB") configuration parameter, and begins to increment/decrement. In step 325, the MAC frame 40 is processed by the second MS 25.

Figure 14:
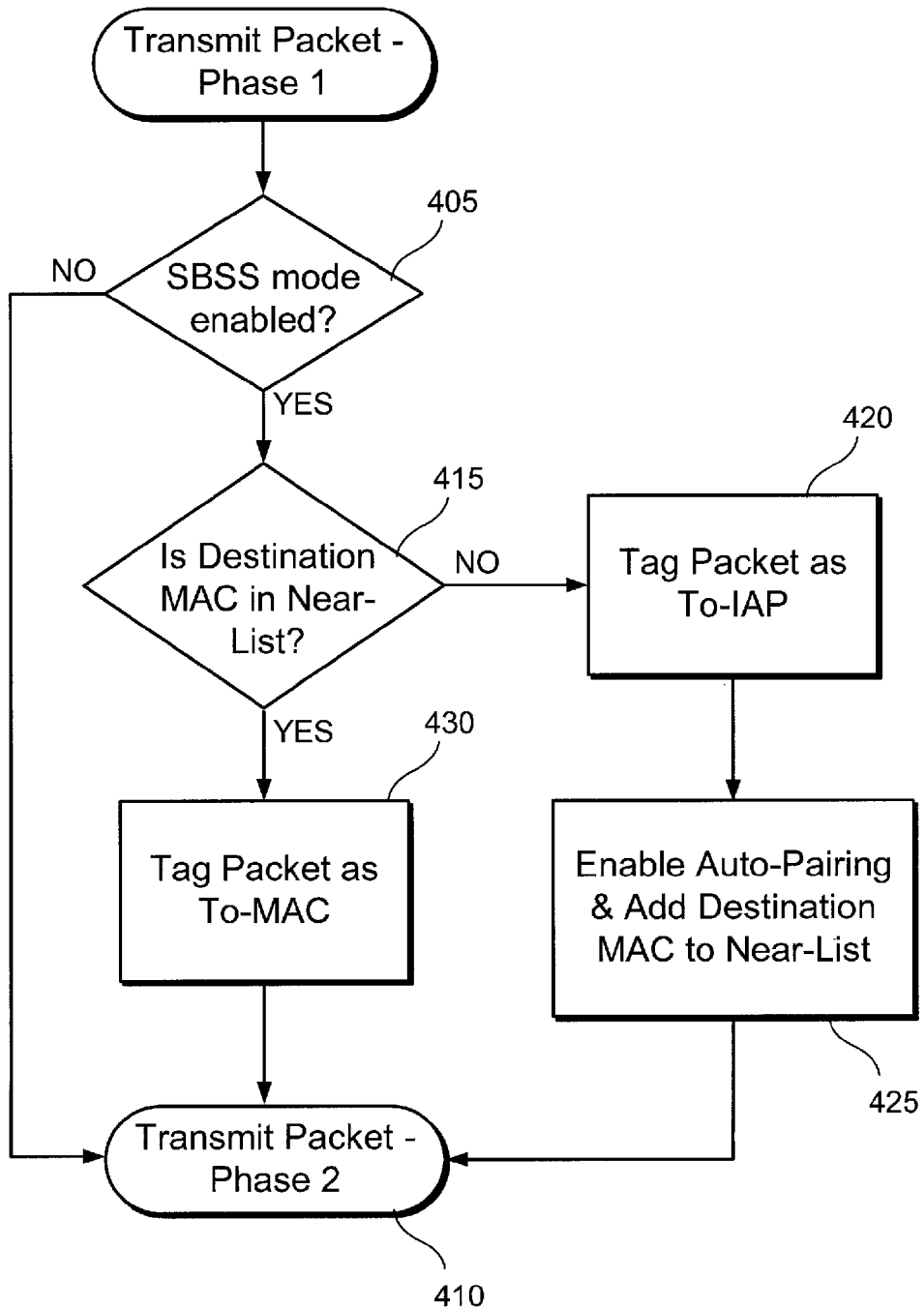
FIG. 14 is an exemplary embodiment of a method for determining which mode of operation to use according to the present invention.

A decision by the first MS 20 regarding which mode of operation to use is shown generally by the exemplary method 400 in FIG. 14. In step 405, the logic circuit determines whether the second mode of operation is enabled. If not enabled, the first MS 20 transmits the data packet according to the first mode of operation, as shown in step 410. If the second mode of operation is enabled, the method 400 proceeds to step 415, wherein the logic circuit in the first MS 20 determines whether the hardware address of the destination MS (e.g., the second MS 25) is listed in the table 200 of the first MS 20. In step 420, if the hardware address of the second MS 25 is not in the table 200, the data packet is tagged to be sent to the AP 15. The first MS 20 then enables the auto-pairing by beginning to listen for the data packet destination signal 185 and/or the MS acknowledgment signal 190 within the RF coverage area 160 and adds the hardware address of the second MS 25 to its table 200, as seen in step 425. If the hardware address of the second MS 25 is in the table 200 of the first MS 20, step 430, then the data packet is tagged to be sent directly to the second MS 25. As understood by those skilled in the art, tagging may be accomplished by inserting the hardware address of the AP 15 or second MS 25 into the MAC frame 40.

Figure 15:
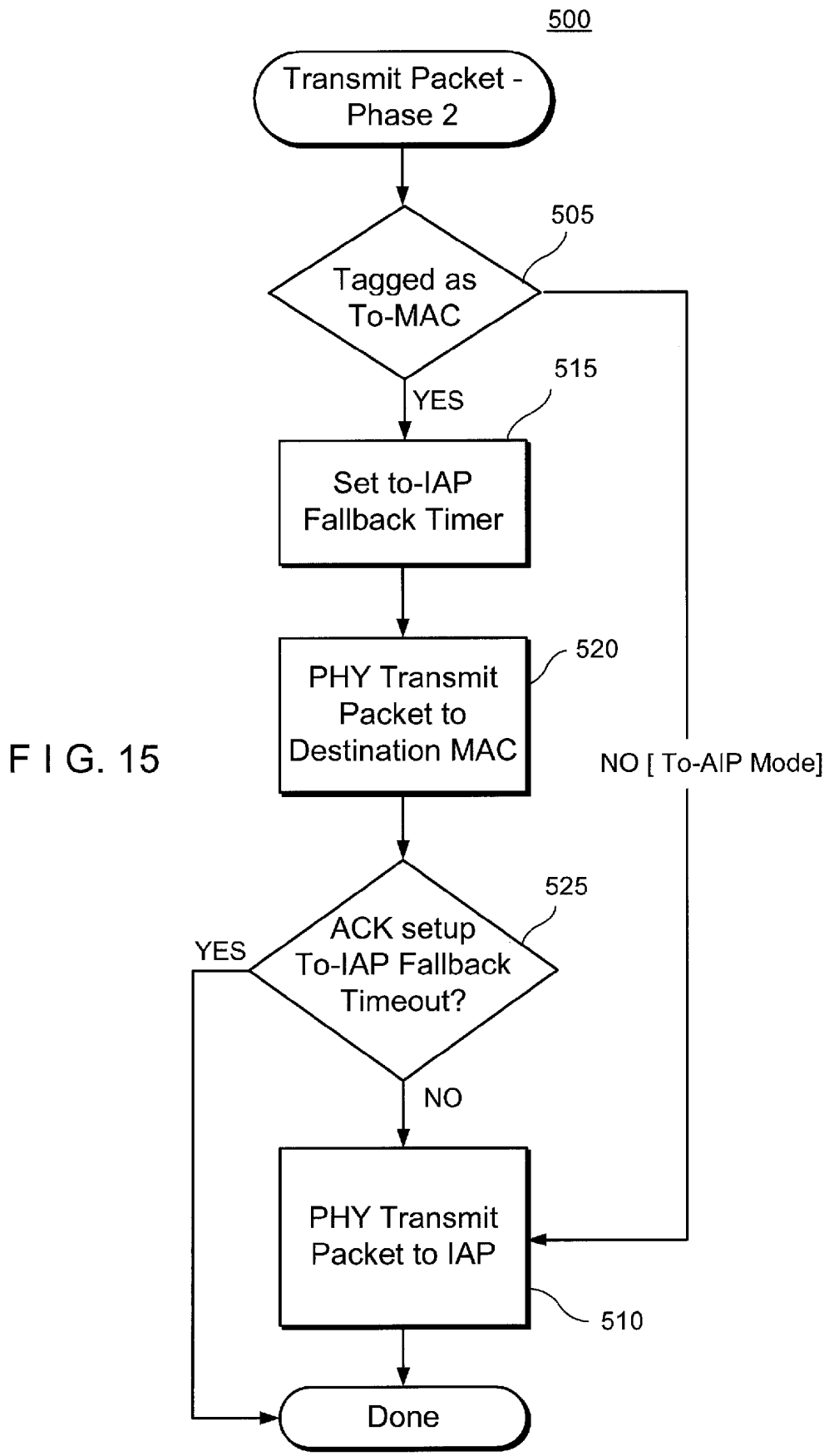
FIG. 15 is an exemplary embodiment of a method for transmitting a data packet according to the present invention.

An exemplary embodiment of a method 500 of transmission of the data packet is shown in FIG. 15. In step 505, the first MS 20 determines whether the data packet is tagged to be sent directly to the second MS 25. If not, the first MS 20 transmits the data packet to the AP 15, as shown in step 510. If the data packet is tagged to be sent directly to the second MS 25, step 515 shows that the first MS 20 sets a fallback timer. As understood by those skilled in the art, the fallback timer may decrement from or increment to a predetermined value, which, when reached, may cause the first MS 20 to retransmit the data packet to the second MS 25 or transmit the data packet to the AP 15. As those skilled in the art would understand, transmission of the data packet to the AP 15 may include, for example, changing the hardware address in the fourth address field 95 and/or re-tagging the data packet to be sent to the AP 15.

In step 520, the first MS 20 transmits the data packet to the second MS 25. After transmission, as seen in step 525, the first MS 20 determines whether it has received the MS acknowledgment signal 190 from the second MS 25 before the fallback timer reaches the predetermined value. If the MS acknowledgment signal 190 has not been received by the first MS 20 before the fallback timer reaches the predetermined value, the data packet is transmitted to the AP 15, as shown in step 510. If the MS acknowledgment signal 190 has been received by the first MS 20, then it may transmit the further data packet signal 195 directly to the second MS 25 and reset the fallback timer (when not a manual pairing).

To further increase performance, the present invention may utilize the request to send/clear to send ("RTS/CTS") mechanism defined by the 802.11 standard and well-known in the art. In this manner, the first MS 20 may complete a RTS/CTS handshake before transmitting the data packet over the wireless network. Use of the handshake may provide positive control over the wireless network and minimize collisions among wireless stations that may be hidden.

An exemplary method 600 for automatically entering hardware addresses in the table 200 is shown in FIG. 16. In step 605, the first MS 20 hears the wireless station transmitting within the RF coverage area 160. As would be understood by those skilled in the art, the wireless station does not have to transmit to the first MS 20, but is simply transmitting the data packet to another wireless station, which may be inside or outside the RF coverage area 160 of the first MS 20.

In step 610, the first MS 20 determines whether the hardware address of the heard wireless station is currently included in the table 200. If the hardware address is in the table 200, the first MS 20 may reset the associated timer value. If the hardware address is not in the table 200, it is added to the table, as shown in step 615, and the timer value is set, as shown in step 620. The hardware address of the heard wireless station is maintained in the table 200 while the timer value is incremented/decremented. In step 625, the first MS 20 determines whether the timer value has reached the limit value, whereby the hardware address of the heard wireless station may be removed from the table 200.

Figure 17:
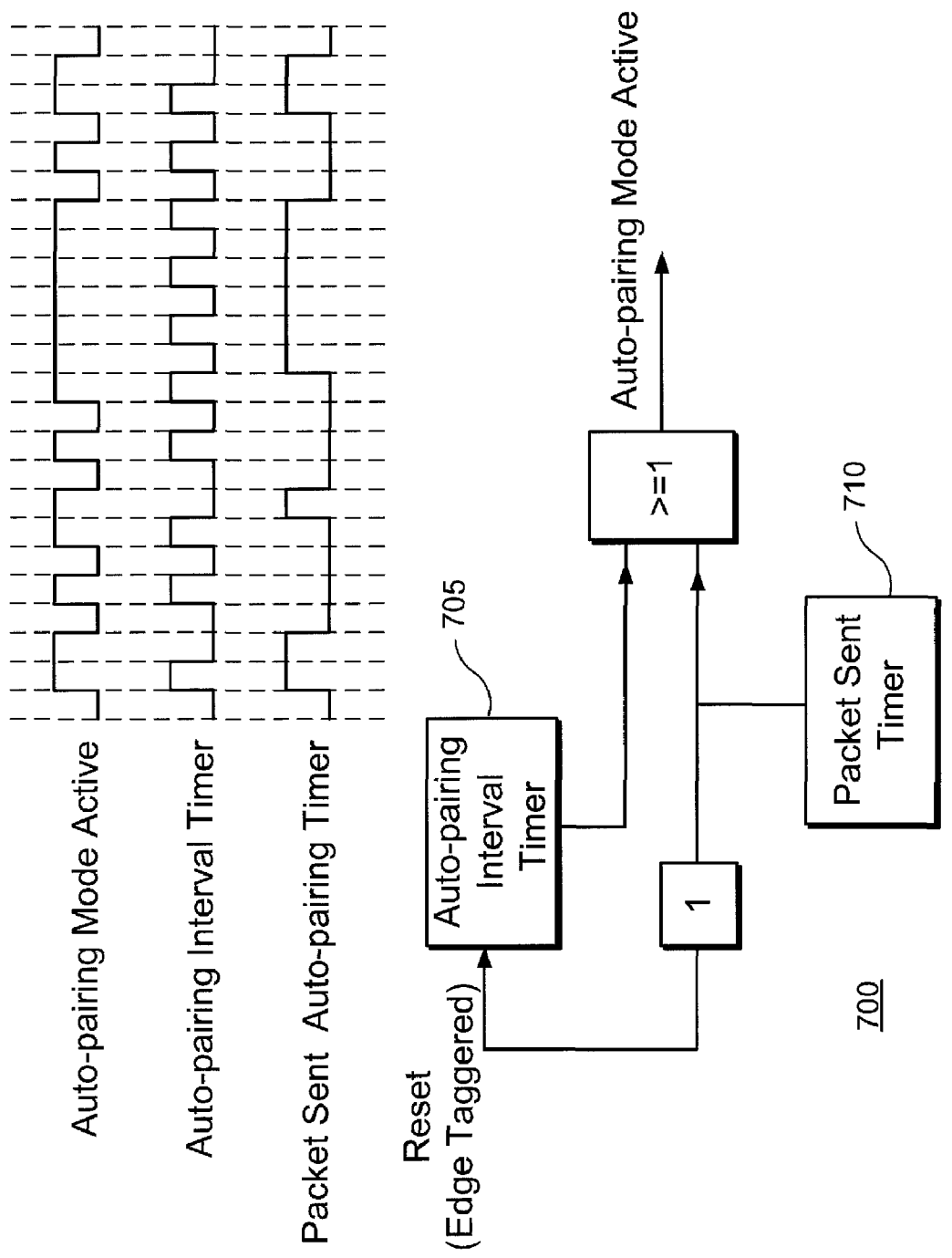
FIG. 17 is an exemplary embodiment of a pairing timer according to the present invention.

An exemplary embodiment of a pairing timer 700 used by the first MS will be described with respect to FIG. 17. In one embodiment, the first MS 20 may be active at all times, listening for other wireless stations within the RF coverage area 160. In a second embodiment, the first MS 20 may be active only for intervals of time. As shown in FIG. 17, the pairing timer 700 may include a first timer 705 and a second timer 710. The first timer 705 may be used for passive listening. That is, the first timer 705 may activate the first MS 20 for a predetermined time (e.g., 3-5 beacon intervals). The first timer 705 may allow the first MS 20 to hear wireless stations within the RF coverage area 160, thereby populating/updating the table 200 of the first MS 20. The first timer 705 may subsequently deactivate the first MS 20 after predetermined or MIB-defined intervals (e.g., 10 beacon intervals). As would be understood by those skilled in the art, the number of beacon intervals for activation/deactivation of the receiver may be optimized depending on the amount of traffic in the AP cell 35 and/or on the wireless network 10.

The second timer 710 may be used to activate the first MS 20 after the data packet has been transmitted to the AP 15. In this manner, the first MS 20 is activated to listen for the data packet destination signal 185 from the AP 15 and/or the MS acknowledgment signal 190 from the second MS 20 for a predetermined or MIB-defined interval (e.g., 5-7 times the current beacon interval). As would be understood by those skilled in the art, the predetermined interval for listening for the signals 185,190 may be modified to increase the probability of hearing the signals 185,190 on the wireless network 10. Further optimization of the predetermined interval may be accomplished by averaging times between transmission of the data packet source signals 175 and heard data packet destination signals 185 and/or the MS acknowledgment signals 190.

Figure 18:
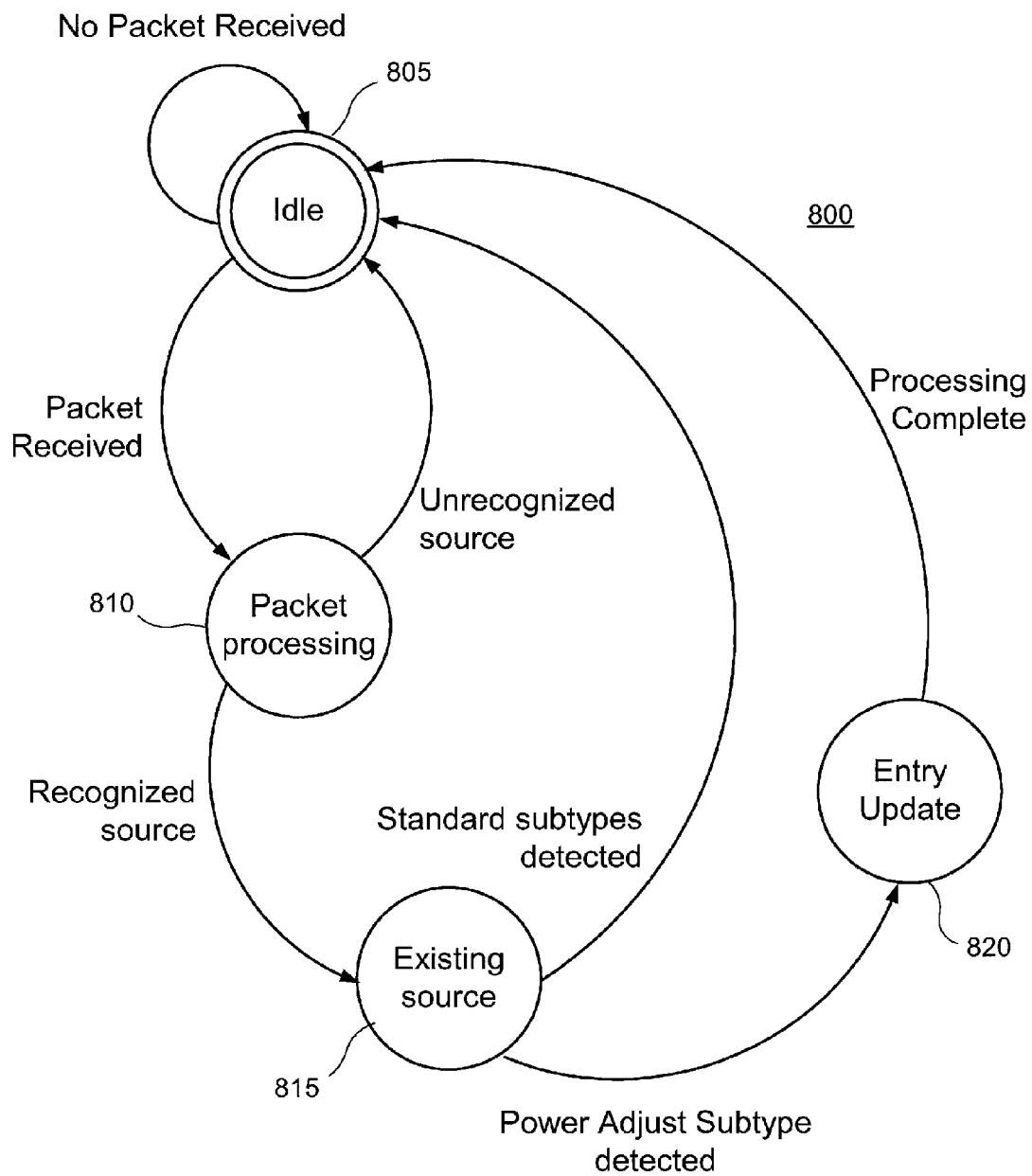
FIG. 18 is an exemplary embodiment of a power adjustment mechanism for the mobile station receiving the data packet according to the present invention.

The present invention further provides for power adjustment of the first MS 20 (e.g., transmitting wireless station) by the second MS 25. Shown in FIG. 18 is an exemplary embodiment of a power adjustment mechanism 800 which may be utilized by the second MS 25 (e.g., wireless station receiving the data packet). In an idle state 805, the second MS 25 is idle, listening for traffic within its RF coverage area 165. In a packet processing state 810, the second MS 25 has received the data packet and begins packet processing. Along with standard packet processing, the logic circuit of the second MS 25 will determine whether the data packet came from the wireless station with its hardware address in the table 200 of the second MS 25 or the wireless station without its hardware address in the table 200 of the second MS 25. If the hardware address is not present in the table 200, the processing moves back to the idle state 805. If the hardware address is present in the table, the second MS 25 moves into an existing source state 815.

In the existing source state 815, the subtype field 110 (shown in FIG. 6) in the frame control field 65 is checked to determine if it contains a power adjust subtype, such as those shown in FIG. 8. If the subtype field 110 does not contain the power adjust subtype, the processing moves back to the idle state 805. If the subtype field 110 does contain the power adjust subtype, the processing moves to an entry update state 820. Depending on the power adjust subtype, a power setting for the next transmission to the first MS 20 will be stored. For example, with reference to FIG. 8, the second MS 25 may indicate to the first MS 20 to increase the power of a next transmission by including a subtype value of "1000" in the subtype field 110.

The present invention further provides for power adjustment of the second MS 25 (e.g., receiving wireless station) by the first MS 20. Shown in FIG. 19 is an exemplary embodiment of a power adjustment mechanism 900 which may be utilized by the first MS 20 (e.g., wireless station transmitting the data packet). In an idle state 905, the first MS 20 is idle, waiting for the data packet to transmit. In a packet processing state 910, the data packet is going to be transmitted from the first MS 20. The logic circuit of the first MS 20 determines whether the data packet will be sent to a wireless station with its hardware address in the table 200 of the first MS 25 or a wireless station without its hardware address in the table 200 of the first MS 25. If the hardware address is not present in the table 200, the processing moves to a transmit packet state 920, where the data packet is transmitted. If the hardware address is present in the table 200, the first MS 20 moves into an existing destination state 915.

In the existing destination state 915, the hardware address of the second MS 25 has a previous received signal strength associated therewith. The previous received signal strength is compared with an optimal received signal strength stored in the first MS 20. The subtype value in the subtype field 110 may be adjusted to reflect the difference in the previous strength and the optimal strength. For example, the first MS 20 may input a "1000" value thereby instructing the second MS 25 to increase the power of its next transmission. When the subtype value has been adjusted, the processing moves to the transmit packet state 920. When the transmission has been completed, the processing returns to the idle state 905.

The present invention further provides a mechanism for encrypting communication using the second mode of operation. As known by those skilled in the art, encryption is a mechanism that encodes transmitted data into a cipher-text to hide its meaning. In order for wireless stations to communicate directly, they may use a common set of encryption keys. For wireless stations that are paired manually, the encryption keys may be entered manually, as well. For wireless stations that are automatically paired, the process of associating with the AP 15 requires that the correct encryption keys be in place.

The present invention further provides a mechanism for authentication, by which wireless stations accessing the wireless network 10 prove their identity. Manual pairing of wireless stations includes inherent authentication, because a user pairing the wireless stations authenticates each. Automatic pairing of wireless stations is inherent in the processed and mechanisms described above, because the wireless station that desires access to the wireless network 10, at some point, authenticates itself to the network 10.

The present invention further provides a mechanism for layer management within the 802.11 standard. Association is a service that establishes an AP/MS mapping that enables the wireless station to access the distribution system. According to the present invention, the wireless station requiring access to the network 10, at some point, communicates with the AP 15. Disassociation is a service that removes an existing association, which occurs when the wireless station leaves the network. According to the present invention, wireless stations may leave the network 10 and remain paired. Re-association (i.e., roaming) is a service that transfers an established association between the MS and the AP from the AP to a further AP. Re-association remains a viable service when used in conjunction with the present invention. A synchronization service between the MSs 20,25 and the AP 15 is maintained through the above-described mechanisms utilizing beacon intervals and delivery traffic indication messages.

A further service provided by the present invention is power management. As is known in the art, the MSs will go into sleep mode when they are inactive for a predefined period of time. Therefore, the MSs may never be heard by other MSs listening to activity in the wireless network 10. According to the present invention, the MS enters a modified sleep mode, whereby it periodically transmits a NULL data packet, or "chirps." The chirps allow other wireless stations within the RF coverage area of the MS to establish communication therewith using the second mode of operation. As would be understood by those skilled in the art, the periodicity of the NULL data packet transmissions may be varied and/or set at arbitrary values.

The second mode of operation provides advantages not available when using solely the first mode of operation. For instance, the second mode of operation may increase the capacity of the system 5. As is known in the art, during a distributed coordination function ("DCF"), wireless stations (e.g., MSs, APs and any other wireless devices) contend temporally for access to the wireless network 10. The wireless stations use a network access mechanism, such as a carrier sense multiple access with collision avoidance ("CSMA/CA") or a carrier sense multiple access with collision detection ("CSMA/CD"). CSMA/CA is a technique where the wireless station wishing to access the wireless network 10 listens to activity on the wireless network 10 before attempting a transmission. Activity on the wireless network 10 is derived from a carrier sensing mechanism provided by a physical layer of the 802.11 standard, which is known to those skilled in the art. By using CSMA/CA, the wireless station attempts to avoid collisions with activity on the wireless network by listening, rather than reacting to collisions detected (i.e., CSMA/CD).

Another advantage provided by the second mode of operation is a decreased time for transmission of the data packet. As mentioned above, the minimum number of hops for transmission of the data packet is two hops. However, in the second mode of operation, the data packet is transmitted in one hop, because transmission through the AP 15 has been eliminated. Direct communication between the first MS 20 and the second MS 25 may increase overall throughput of the system 5, reduce latency of transmission of the data packet and reduce aggregate power of the system 5 which is consumed by transmission of the data packet. As understood by those skilled in the art, power consumption has an inversely proportional relationship with battery life. Thus, reduction of the aggregate power may extend the battery life.

A further advantage provided by the second mode of operation is a decrease in an amount of noise present on the wireless network 10. As well as reducing traffic, transmissions between the first MS 20 and the second MS 25 may use a lower power because the MSs 20,25 may be within a close range. Close range communication may reduce interference within the wireless network 10.

The above-described advantages are simply illustrative, and by no means exhaustive of the benefits of the present invention. The present invention may be further utilized in a person-to-person ("P2P") voice system, a P2P priority system and a P2P communication system which utilizes a mesh network.

The present invention has been described with the reference to the MSs 20,25, the AP 15, and the RF coverage areas 160,165. One skilled in the art would understand that the present invention may also be successfully implemented. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A mobile station, comprising:
a processor; and
a memory containing a table and storing a set of instructions for execution on the processor;
wherein the set of instructions, when executed, causes the mobile station to:
listen for one of a transmission of a data packet by an access point to a further mobile station and a transmission of an acknowledgment by the further mobile station to the access point;
add an address of the further mobile station to the table when the one of the listened for transmissions is detected; and
send a further data packet destined for the further mobile station directly to the further mobile station when the address is present in the table.

2. The mobile station according to claim 1, wherein the address includes a hardware address of the further mobile station.

3. The mobile station according to claim 2, wherein the hardware address has a timer value associated therewith.

4. The mobile station according to claim 3, wherein the mobile station initiates communication with the further mobile station before an expiration of the timer value.

5. The mobile station according to claim 1, wherein the address is a media access control address.

6. The mobile station according to claim 1, wherein the instructions cause the mobile station to remove the address from the table when a timer value associated with the address expires.

7. The mobile station according to claim 1, wherein the instructions cause the mobile station to receive a further acknowledgment from the further mobile station after the further mobile station has received the further data packet.

8. The mobile station according to claim 1, wherein the instructions cause the mobile station to resend the further data packet to the further mobile station when a timer expires before reception of an acknowledgment from the further mobile station.

9. A mobile station, comprising:
a processor; and
a memory containing a table and storing a set of instructions for execution on the processor;
wherein the set of instructions, when executed, causes the mobile station to:
check a data packet received from a further mobile station;
check a field of a media access control frame when a hardware address of the further mobile station is present in the table of the mobile station that received the data packet;
store a value for adjusting a transmission power of the further mobile station based on a value in the field; and
transmit to the further mobile station a next media access control frame that includes the value for adjusting the transmission power.

10. The mobile station according to claim 9, wherein the instruction for checking the field of the media access control frame includes at least one instruction for checking a subtype field.

11. The mobile station according to claim 10, wherein the instruction for checking the subtype field includes an instruction for determining whether the subtype field includes a power adjust subtype.

12. A mobile station, comprising:
a processor; and
a memory containing a table and storing a set of instructions for execution on the processor;
wherein the set of instructions, when executed, causes the mobile station to:

check whether a hardware address of a further mobile station to which a data packet is to be transmitted is present in the table of the mobile station;

if the hardware address is present in the table, compare a signal strength associated with the further mobile station to a threshold signal strength;

insert into the data packet a value for initiating a power adjustment in the further mobile station based on a result of the comparing; and after the inserting, transmit to the further mobile station the data packet.

13. A system, comprising:

a first mobile station;

a second mobile station; and an access point, the first mobile station including a processor provided with instructions for causing the first mobile station to:

send a data packet destined for the second mobile station to the access point;

listen for one of a transmission of the data packet by the access point to the second mobile station and a transmission of an acknowledgment by the second mobile station to the access point;

add an address of the second mobile station to a table when the one of the listened for transmissions is detected; and send a further data packet destined for the second mobile station directly to the second mobile station when the address is present in the table.

14. The system according to claim 13, wherein the table stores a hardware address of the second mobile station.

15. The system according to claim 14, wherein the hardware address has a timer value associated therewith.

16. The system according to claim 14, wherein when the one of the listened for transmissions is detected, the first mobile station resets a timer value associated with the hardware address.

17. The system according to claim 13, wherein the first mobile station sends the further data packet directly to the second mobile station when the second mobile station enters a radio frequency coverage area of the mobile station.

18. The system according to claim 13, wherein the address is a media access control address.

19. The system according to claim 13, wherein the first mobile station removes the address from the table when a timer value associated with the address expires.

20. The system according to claim 13, wherein the first mobile station receives an acknowledgment from the second mobile station after the second mobile station has received the further data packet.

* * * * *